United States Patent
Gardner

[15] 3,699,435
[45] Oct. 17, 1972

[54] SIGNAL SPECTRUM GENERATOR
[72] Inventor: Robert E. Gardner, Temple Hills, Md.
[73] Assignee: The United States of America as represented by the Secretary of the Navy
[22] Filed: July 26, 1971
[21] Appl. No.: 166,152

[52] U.S. Cl. .................... 324/57 R, 328/16, 328/30, 328/61
[51] Int. Cl. .............................................. G01r 27/00
[58] Field of Search....324/57 R, 77 B, 77 R; 328/16, 328/30, 39, 61; 84/1.01

[56] References Cited
UNITED STATES PATENTS
2,566,085    8/1951    Green...........................328/30

3,499,090    3/1970    Meyer........................84/1.01

FOREIGN PATENTS OR APPLICATIONS
1,417,309    10/1965    France.....................324/57 R

*Primary Examiner*—Stanley T. Krawczewicz
*Attorney*—R. S. Sciascia et al.

[57] ABSTRACT

This invention consists of a plurality of dividers connected in series, the outputs of which are added and provide (by Fourier series expansion of square waves) a spectrum of the harmonics of the fundamental frequency. At this comb of spectral lines is of precisely known frequencies and amplitudes, an entire frequency band of interest of a data system may be calibrated in a single operation.

2 Claims, 2 Drawing Figures

INVENTOR
ROBERT E. GARDNER

SIGNAL SPECTRUM GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

To properly calibrate a data acquisition system or other electronic instrumentation over a range of frequencies is normally a tedious task. The calibration signal most frequently used is a single tone which is progressively tuned and stepped in amplitude through the system frequency band. Thus a separate recording, playback, and analysis is required for each frequency used which can be very time-consuming if the frequency band to be covered is of any size.

Another method commonly used is to utilize "white" noise which has a constant power density throughout the frequency band. This method does not provide a realistic signal for a system concerned primarily with discrete spectral lines generated by a complex period waveform. If a narrow frequency analysis filter bandwidth is used the filtered noise level will necessarily be low and the analysis system will not be operated at the normal level. Further, many systems behave differently with noise because the statistical amplitude fluctuations contain peaks which may cause overloading and saturation. Thus it is seen that the prior art does not provide a spectrum generator which produces a plurality of discrete spectral lines of known frequencies and at various known amplitudes such that an entire frequency band may be calibrated at one time.

SUMMARY OF THE INVENTION

This invention provides for the calibration of a data acquisition system or electronic instrumentation by providing a spectrum of various discrete frequencies, each of which is of a determinable amplitude, which are fed into a data system for calibration. The output of the data system should be representative of the input spectrum. This calibration output is then fed to a spectrum analysis system which analyzes the discrete lines of the spectral comb for correct frequency and amplitude thereby giving an indication of the response and linearity of the data acquisition system under calibration.

OBJECTS OF THE INVENTION

An object of the invention is to provide an improved spectrum generator.

Another object of the invention is to provide a spectrum generator which provides a noninterfering spectral comb sufficient to be used to calibrate a data system over its entire frequency spectrum.

A still further object is to provide a spectrum which is composed of a plurality of discrete frequencies each of said frequencies having a determinable amplitude.

DESCRIPTION OF THE PREFERRED EMBODIMENT

This invention provides a calibration signal consisting of the linear sum of a multiplicity of precise square waves whose fundamental frequencies are octave-related, which are fed into a data acquisition system for the purpose of calibrating the data system. The data system output which is representative of the signal input is supplied to a spectrum analysis system which provides data as to the frequency and amplitude of each of the spectral lines in the output of the data system. As the input to the data system spectrum is made up of known frequency and amplitude spectral lines, the analysis system may supply data which shows the change in frequency or amplitude due to the response of the data system. Thus the entire spectrum of the data system may be checked for calibration at one time rather than by a tedious check of stepping a single tone through the system frequency band.

Figure 1:
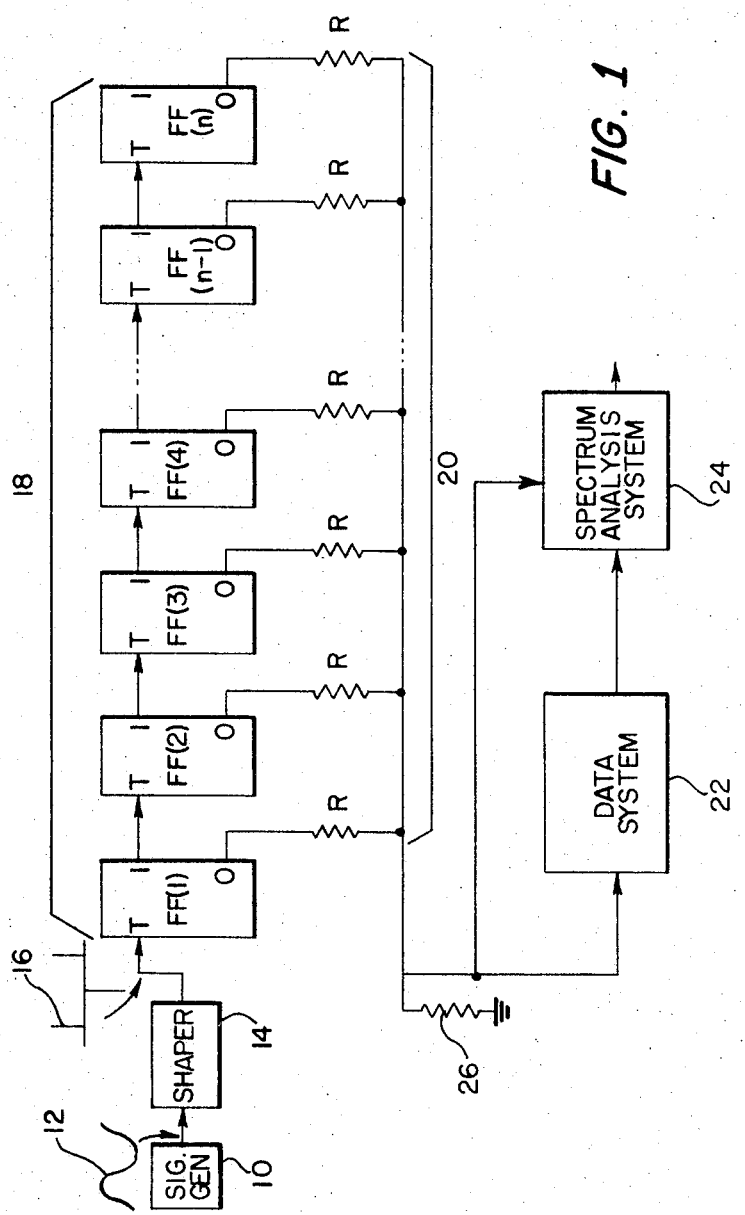
FIG. 1 shows the preferred embodiment of the invention.
Figure 2:
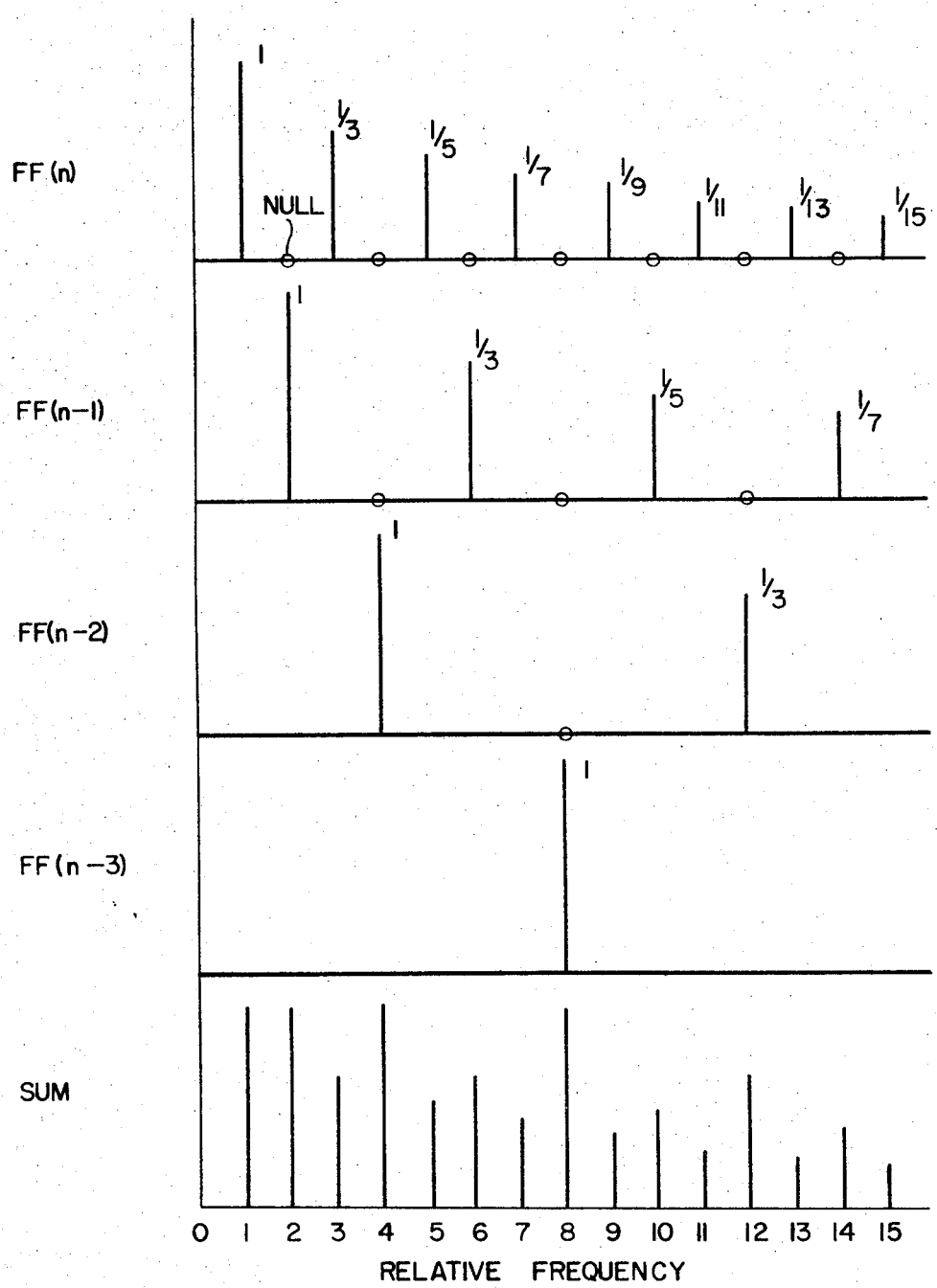
FIG. 2 shows the relative frequency spectral lines for the last four bistable devices in a chain of length n.

Now referring to FIG. 1, which shows the preferred embodiment of the invention, a stable signal generator 10 providing a sinusoid 12. The sinusoid 12 is shaped by a shaper 14 and produces an output 16 to drive binary divider 18. The outputs of the divider are summed by resistive summing network 20, and load resistor 26 and then coupled to the data system 22 and to the spectrum analysis system 24 to check its operation. The divider comprises a series of flip-flops FF(1)–FF(n) where n may be any integer. The 1 output of each flip-flop is connected to and triggers the next flip-flop. The 0 output of each of the flip-flops is connected to resistive summing network 20, which combines each of the outputs together to form the spectral comb across load resistor 26. As the shaper output 16 trigger pulses are equally spaced (only one polarity is used), divider 18 is driven by the equally spaced trigger pulses 16 and the outputs of each flip-flop will be square waves of precisely 50 percent duty cycle. A square wave of 50 percent duty cycle is a spectrum comprised of the infinite sum of the odd harmonics of the fundamental frequency of the square wave. The amplitudes of these harmonics are exactly $1/h$ times that of the fundamental, where $h$ is the harmonic number. FIG. 2 shows a partial frequency spectrum showing the outputs last four flip-flops of an $n$-length divider and their sum. The amplitudes are shown in approximate logarithmic scale. The partial spectrum for FF($n$) shows the fundamental, its odd harmonics, and the even-harmonic nulls as only odd harmonics exist. It should be noted that there is no interference between these harmonics. Since the fundamental frequencies are even multiples of the lowest frequency in the divider chain, their odd harmonics fall either in clear regions or at the even-harmonic nulls of other fundamentals. Therefore there is no interference between any harmonics and thus their amplitudes will be exactly as calculated. The SUM in FIG. 2 shows the sums of FF($n$) + FF($n$−1) + FF($n$−2) + FF($n$−3) where the fundamentals are 1, 2, 4 and 8.

In the typical application covering the audio frequency band, a chain of six flip-flops with an input frequency of 32 kHz might be used. The spectrum will contain fundamental frequencies 0.5, 1, 2, 4, 8 and 16 kHz and all harmonics of 500 Hz except even multiples of 16 kHz. The table below gives a partial listing of frequencies and amplitudes in dB relative to the fundamental component:

| Amplitude (dB) | Frequencies (kHz) |
| --- | --- |
| 0 | 0.5, 1, 2, 4, 8, 16 |
| −9.5 | 1.5, 3, 6, 12, 24 |
| −14.0 | 2.5, 5, 10, 20 |
| −16.9 | 3.5, 7, 14, 28 |
| −19.1 | 4.5, 9, 18 |
| −20.8 | 5.5, 11, 22 |
| −22.3 | 6.5, 13, 26 |
| −23.5 | 7.5, 15, 30 |

Any frequency may be used from near-zero to as high as the particular circuits utilized will operate reliably. Even the most inexpensive integrated circuits can be used up to at least 1 MHz. However, if they are used at frequencies too near their maximum rated frequency, the output waveform will not be a high quality square wave and the spectral components will deviate somewhat from their theoretical amplitude values.

It should be emphasized that the flip-flop outputs should be both square (clean and sharp corners) and have precisely a 50 percent duty cycle, otherwise the spectral comb will deviate in amplitude (attenuation of high frequency harmonics) and frequency (i.e., a duty cycle of other than 50 percent would cause spectral lines to appear at what should be null points.).

Since the lines in the composite spectrum have a wide range of amplitudes, the calibration signal is very useful for checking the amplitude characteristics of a data analysis system. For example, the outputs of a contiguous-filter spectrum analyzer or its digital equivalent might be squared, integrated and plotted. Thus if the fundamental components showed that the system frequency response was reasonably flat, the lower-amplitude (higher dB) lines would give an indication of the amplitude response.

There has been disclosed a spectrum generator, which provides a very accurate frequency spectrum with very accurate range of various amplitudes, for use in the calibration of data acquisition systems, electronic instrumentation and data analysis systems.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. Apparatus for calibrating a data system comprising:

spectrum generator means for producing a spectral comb which consists of a plurality of discrete spectral lines of various related predeterminable frequencies and various predeterminable amplitudes;

said spectrum generator means being connected to said data system to be calibrated; the output of said data system being connected to a spectrum analysis means for analyzing said frequencies and amplitudes to check the data systems frequency and amplitude response;

said spectrum generator means comprising a binary divider including a plurality of dividing stages;

the outputs of said stages being added in an adder to form said spectral comb.

2. The apparatus of claim 1, which further includes a signal generator means for driving said binary divider to produce a 50 percent duty cycle.

* * * * *